(12) United States Patent
Kawamura et al.

(10) Patent No.: US 11,292,908 B2
(45) Date of Patent: Apr. 5, 2022

(54) EASY-TO-TEAR, UNSTRETCHED RESIN FILM AND LAMINATE FILM FOR PACKAGING MATERIAL USING THE SAME

(71) Applicants: TOYO SEIKAN GROUP HOLDINGS, LTD., Tokyo (JP); Toyo Seikan Co., Ltd., Tokyo (JP)

(72) Inventors: Satoshi Kawamura, Yamaguchi (JP); Jiro Tomita, Yamaguchi (JP); Takafumi Ohsawa, Kanagawa (JP); Yoshihiro Ohta, Kanagawa (JP); Takuya Hara, Kanagawa (JP)

(73) Assignees: Toyo Seikan Group Holdings, Ltd., Tokyo (JP); Toyo Seikan Co., Ltd., Tokyo (JP)

( * ) Notice: Subject to any disclaimer, the term of this patent is extended or adjusted under 35 U.S.C. 154(b) by 103 days.

(21) Appl. No.: 16/318,896

(22) PCT Filed: Jul. 14, 2017

(86) PCT No.: PCT/JP2017/025744
§ 371 (c)(1),
(2) Date: Jan. 18, 2019

(87) PCT Pub. No.: WO2018/016439
PCT Pub. Date: Jan. 25, 2018

(65) Prior Publication Data
US 2019/0185660 A1    Jun. 20, 2019

(30) Foreign Application Priority Data
Jul. 20, 2016    (JP) .............................. JP2016-142077

(51) Int. Cl.
*C08L 67/02*    (2006.01)
*B32B 27/36*    (2006.01)
(Continued)

(52) U.S. Cl.
CPC .............. *C08L 67/02* (2013.01); *B32B 27/08* (2013.01); *B32B 27/36* (2013.01); *B65D 65/40* (2013.01);
(Continued)

(58) Field of Classification Search
None
See application file for complete search history.

(56) References Cited

U.S. PATENT DOCUMENTS 4,765,999 A * 8/1988 Winter .................... B32B 27/36
426/113
6,045,902 A * 4/2000 Imanishi .................. B29D 7/01
264/171.1
(Continued)

FOREIGN PATENT DOCUMENTS

EP    1629971 A1    3/2006
EP    2899024 A1    7/2015
(Continued)

OTHER PUBLICATIONS

"Omnexus—Glass Transition Temperature." (https://omnexus.specialchem.com/polymer-properties/properties/glass-transition-temperature) (webpage retrieved May 19, 2021). (Year: 2021).*
(Continued)

*Primary Examiner* — Vivian Chen
(74) *Attorney, Agent, or Firm* — Foley & Lardner LLP (57) ABSTRACT

This invention provides an easy-to-tear resin film. Such easy-to-tear resin film is an easy-to-tear, unstretched resin film composed of a blend of a polyethylene terephthalate-based resin with the second resin having a difference in SP value from the polyethylene terephthalate-based resin of 1.1 to 4.0 $(cal/cm^3)^{0.5}$. This invention also provides a laminate film 1B for a packaging material comprising the easy-to-tear, unstretched resin film 10 between the inner layer film
(Continued)

20 serving as a heat seal surface and the surface layer film 30 comprising an isophthalic acid-modified polyethylene terephthalate resin having a copolymerization ratio of isophthalic acid component of 0 mol % to 5 mol %.

3 Claims, 2 Drawing Sheets (51) Int. Cl.
    B65D 65/40    (2006.01)
    C08J 5/18    (2006.01)
    B32B 27/08    (2006.01)
    C08L 23/08    (2006.01)
    C08L 33/20    (2006.01)
    C08L 67/03    (2006.01)
    C08L 33/12    (2006.01)

(52) U.S. Cl.
    CPC .............. *C08J 5/18* (2013.01); *C08L 23/0823* (2013.01); *C08L 33/20* (2013.01); *B32B 2255/26* (2013.01); *B32B 2264/102* (2013.01); *B32B 2270/00* (2013.01); *B32B 2307/31* (2013.01); *B32B 2307/582* (2013.01); *B32B 2367/00* (2013.01); *C08L 23/083* (2013.01); *C08L 23/0807* (2013.01); *C08L 33/12* (2013.01); *C08L 67/03* (2013.01); *C08L 2203/16* (2013.01); *C08L 2203/162* (2013.01); *C08L 2205/14* (2013.01); *C08L 2207/02* (2013.01)

(56) References Cited

U.S. PATENT DOCUMENTS

| | | | | |
|---|---|---|---|---|
| 6,331,343 | B1 * | 12/2001 | Perez | C08J 5/18 428/141 |
| 6,361,856 | B1 * | 3/2002 | Wakai | B32B 27/32 428/220 |
| 6,586,073 | B2 * | 7/2003 | Perez | B32B 27/12 264/288.8 |
| 2001/0006736 | A1 * | 7/2001 | Kuroda | B32B 27/32 428/517 |
| 2005/0118406 | A1 * | 6/2005 | Shelby | C08L 67/02 428/304.4 |
| 2009/0032602 | A1 | 2/2009 | Mutsuo et al. | |
| 2009/0110888 | A1 * | 4/2009 | Wuest | B32B 27/08 428/200 |
| 2009/0131626 | A1 * | 5/2009 | Sheppard | C08G 63/183 528/272 |
| 2009/0187002 | A1 * | 7/2009 | Nichols | C08G 63/80 528/308.3 |
| 2015/0258757 | A1 * | 9/2015 | Ishizaki | A61F 13/00076 428/480 |
| 2016/0060457 | A1 * | 3/2016 | Takahashi | C08L 69/00 525/146 |
| 2019/0351651 | A1 * | 11/2019 | Ohsawa | B32B 15/20 |
| 2020/0017276 | A1 * | 1/2020 | Hongou | B65D 77/225 |

FOREIGN PATENT DOCUMENTS

| | | | |
|---|---|---|---|
| JP | 05-305108 A | | 11/1993 |
| JP | 06-220220 A | * | 8/1994 |
| JP | 07-292129 A | * | 11/1995 |
| JP | 2004-196951 A | * | 7/2004 |
| JP | 2014-061633 A | | 4/2014 |
| JP | 2014-061663 A | | 4/2014 |
| JP | 2014-151945 A | | 8/2014 |
| KR | 10-2000-0001369 A | | 1/2000 |

OTHER PUBLICATIONS

Supplementary European Search Report dated Jan. 16, 2020, in EP 17830958.9.
International Search Report dated Sep. 12, 2017, in PCT/JP2017/025744.
Office Action dated Apr. 21, 2021 in JP 2018-528524.
Office Action dated Aug. 24, 2021 in KR 10-2019-7001425.

* cited by examiner

EASY-TO-TEAR, UNSTRETCHED RESIN FILM AND LAMINATE FILM FOR PACKAGING MATERIAL USING THE SAME

CROSS-REFERENCE TO RELATED APPLICATIONS

This application is the U.S. National Stage of PCT/JP2017/025744, filed Jul. 14, 2017, which claims priority to JP 2016-142077, filed Jul. 20, 2016.

TECHNICAL FIELD

The present invention relates to an easy-to-tear, unstretched resin film and a laminate film for a packaging material using the same.

BACKGROUND ART

To date, resin-based laminate films used as packaging materials that are filled with various types of drugs, food products, and the like and hermetically sealed with heat seals have been known. For example, Patent Literature 1 discloses a packaging material for microwave cooking composed of a laminate film comprising a polyester film, a polyester film with a barrier layer, a linearly-torn polyester film, and a heat-sealable polyolefin film successively stacked on top of the other.

In the past, a patch, in particular, a transdermal patch containing a medicament in an adhesive layer was hermetically sealed with a sealed packaging material for the purpose of quality maintenance during storage. When a patch containing an oil component in an adhesive agent is packaged with a packaging material, however, a patch is brought into contact with the inner surface of the packaging material, the oil component is adsorbed or transferred to the packaging material, the content of the oil component in the adhesive agent varies, and adhesion properties change, disadvantageously. In the case of a transdermal patch, problems, such as deteriorated transdermal absorption of the drug or lowered pharmacological effects caused by adsorption of the drug contained therein, are pointed out. In order to overcome such problems, preparation of an inner surface of a packaging material from an ethylene/vinyl alcohol copolymer or acrylonitrile/methyl acrylate copolymer is proposed (Patent Literature 2).

However, an ethylene/vinyl alcohol copolymer or acrylonitrile/methyl acrylate copolymer is expensive, and a substance that could serve as an alternative thereto has been desired. Patent Literature 3 discloses a packaging material comprising an inner layer film composed of a heat-sealable polyethylene terephthalate resin and a substrate film, wherein a heat seal surface of the inner layer film is composed of an isophthalic-acid-modified polyethylene terephthalate resin having a copolymerization ratio of isophthalic acid component of 10 mol % to 20 mol %. Patent Literature 3 discloses that such packaging material can prevent an oil component contained in an adhesive agent of a patch from being adsorbed or transferred to the packaging material and that such packaging material can exhibit excellent heat sealability.

PRIOR ART LITERATURE

Patent Literature

[Patent Literature 1] JP 2014-151945 A
[Patent Literature 2] JP H05-305108 A (1993)
[Patent Literature 3] JP 2014-61663 A

SUMMARY OF THE INVENTION

Objects to Be Attained by the Invention

It is important that a laminate film for a packaging material is sufficiently easy to open (i.e., easy to tear) when opening the packaging material, as well as it has various properties, such as heat sealability described above. While the packaging material according to Patent Literature 3 is excellent in heat sealability, tear strength thereof was relatively high, and some improvement was necessary in such packaging material.

It is an object of the present invention to provide an easy-to-tear resin film that is suitably used as, for example, a layer constituting the packaging material according to Patent Literature 3. It is another object of the present invention to provide a laminate film for a packaging material with the use of the easy-to-tear resin film.

Means for Attaining the Objects

The present inventors have conducted concentrated studies in order to attain the above objects. As a result, they discovered that the objects as described above could be attained by an unstretched film comprising a blend of a polyethylene terephthalate-based resin mainly composed of polyethylene terephthalate and a resin that is immiscible with the polyethylene terephthalate-based resin and shows a difference in SP value of a given range. This has led to the completion of the present invention. Specifically, the present invention is summarized as follows.

(1) An easy-to-tear, unstretched resin film comprising a blend of a polyethylene terephthalate-based resin and a second resin having a difference in SP value from the polyethylene terephthalate-based resin of 1.1 to 4.0 $(\text{cal}/\text{cm}^3)^{0.5}$.
(2) The easy-to-tear, unstretched resin film according to (1), wherein the proportion of the polyethylene terephthalate-based resin is 60% to 80% by weight and the proportion of the second resin is 40% to 20% by weight.
(3) The easy-to-tear, unstretched resin film according to (1) or (2), wherein the second resin has Tg that is higher than Tg of the polyethylene terephthalate-based resin by at least 25° C.
(4) The easy-to-tear, unstretched resin film according to any of (1) to (3), wherein the melt viscosity ratio of the second resin to the polyethylene terephthalate-based resin is 0.3 to 1.6 at 270° C. and a shear rate of 121.6 (1/second).
(5) The easy-to-tear, unstretched resin film according to any of (1) to (4), wherein the second resin is a cycloolefin resin or acryl resin.
(6) The easy-to-tear, unstretched resin film according to any of (1) to (5), wherein the second resin is dispersed in a particulate state in the polyethylene terephthalate-based resin and the average aspect ratio of the particles is 1 to 5.
(7) The easy-to-tear, unstretched resin film according to any of (1) to (6), wherein the tear strength in the longitudinal direction and that in the transverse direction are both 0.25 N or lower.
(8) A laminate film for a packaging material comprising at least an inner layer film serving as a heat seal surface and the easy-to-tear, unstretched resin film according to any of (1) to (7).
(9) A laminate film for a packaging material comprising at least an inner layer film serving as a heat seal surface, a surface layer film of an isophthalic acid-modified polyethylene terephthalate resin having a copolymerization ratio of isophthalic acid component of 0 mol % to 5 mol %, and the easy-to-tear, unstretched resin film according to any of (1) to (7) between the inner layer film and the surface layer film.
(10) The laminate film for a packaging material according to (8) or (9), wherein the inner layer film comprises an isophthalic acid-modified polyethylene terephthalate resin having a copolymerization ratio of isophthalic acid component of 10 mol % to 20 mol %.

This description includes part or all of the content as disclosed in Japanese Patent Application No. 2016-142077, which is a priority document of the present application.

Effects of the Invention

According to the present invention, an easy-to-tear resin film can be obtained. An unstretched resin film that is easy to tear according to the present invention has not yet been known. According to the present invention, in addition, a laminate film that is suitable for a packaging material of a drug, a food product, and the like can be obtained with the use of the easy-to-tear, unstretched resin film described above.

DESCRIPTION OF EMBODIMENTS

Hereafter, the present invention is described in detail.

The resin film according to the present invention is composed of a blend of a polyethylene terephthalate-based resin and a second resin, and it is an easy-to-tear, unstretched resin film. A difference in SP value between the polyethylene terephthalate-based resin and the second resin is 1.1 to 4.0 $(cal/cm^3)^{0.5}$. When a difference in SP value is 1.1 $(cal/cm^3)^{0.5}$ or more, the polyethylene terephthalate-based resin becomes immiscible with the second resin, the droplet-like second resin is dispersed in the polyethylene terephthalate-based resin, and tear strength of the film is deteriorated. In contrast, a resin having a difference in SP value exceeding 4.0 $(cal/cm^3)^{0.5}$ is poor in terms of film formation and such resin is not suitable as the second resin.

A polyethylene terephthalate-based resin that constitutes the easy-to-tear, unstretched resin film according to the present invention is a polyester homopolymer or copolymer mainly composed of polyethylene terephthalate. In such polyester, specifically, 80 mol % or more of the monomer component of the dicarboxylic acid component and the glycol component is composed of terephthalic acid and ethylene glycol. As a dicarboxylic acid component other than terephthalic acid, at least one component selected from the group consisting of isophthalic acid (IA), orthophthalic acid, p-β-oxyethoxybenzoic acid, naphthalene-2,6-dicarboxylic acid, diphenoxyethane-4,4'-dicarboxylic acid, 5-sodium sulfoisophthalic acid, hexahydroterephthalic acid, adipic acid, and sebacic acid is preferably contained. A dicarboxylic acid component is more preferably a copolymer that further comprises isophthalic acid. The amount of isophthalic acid added is preferably 1 mol % to 15 mol %, and particularly preferably 1 mol % to 5 mol %, based on the whole dicarboxylic acid component. As other polyvalent carboxylic acids, a very small amount of trimellitic acid or pyromellitic acid may be contained.

It is preferable that the glycol component consist of ethylene glycol; however, other glycol components, such as one or more components selected from among propylene glycol, 1,4-butanediol, diethylene glycol, 1,6-hexylene glycol, cyclohexanedimethanol, and an ethylene oxide adduct of bisphenol A may be contained within the scope of the present invention.

The second resin to be blended with the polyethylene terephthalate-based resin is not particularly limited, provided that a difference in SP value (solubility parameter) from the polyethylene terephthalate-based resin is within the range of 1.1 to 4.0 $(cal/cm^3)^{0.5}$. Such resin can be adequately selected from among various types of resins. For example, SP value of the polyethylene terephthalate-based resin is 12.4 $(cal/cm^3)^{0.5}$. Accordingly, the second resin can be one or more resins selected from among, for example, ethyl polyacrylate (SP value: 9.7), butyl polyacrylate (9.2), polyacrylonitrile (14.4), polyisoprene (8.7), polyvinylidene chloride (11.2), polyvinyl chloride (11.0), polystyrene (10.6), polyvinyl alcohol (16.0), polybutadiene (8.4), polymethyl methacrylate (9.9), and cycloolefin resin (COC: 10.0 to 10.4 and COP: 9.3 depending on a copolymerization ratio). A difference in SP value from the polyethylene terephthalate-based resin is more preferably within a range of 1.3 to 3.7 $(cal/cm^3)^{0.5}$.

In the present invention, SP value is calculated using the Fedors' formula that estimates SP value based on a molecular structure. In the Fedors' formula, a molar volume of a compound having Tg over 25° C. is occasionally corrected in accordance with the number of atoms in the main chain skeleton of the minimal repeating unit. In the present invention, however, SP value is not corrected in accordance with Tg.

Among the resins mentioned above, the second resins are particularly preferably an acryl resin and a cycloolefin resin because of low tear strength of the film and ease of forming an unstretched film when blended with the polyethylene terephthalate-based resin. An acryl resin is a polymer of acrylic ester or methacrylic ester. As described above, for example, methyl polyacrylate, ethyl polyacrylate, butyl polyacrylate, and polymethyl methacrylate can be used. Examples of cycloolefin resin include a cycloolefin-noncyclic olefin addition copolymer (cycloolefin copolymer, COC), a ring-opening metathesis polymer of one or more cycloolefins, and a polymer obtained by hydrogenating the ring-opening metathesis polymer (cycloolefin polymer, COP). Examples of cycloolefin include norbornene-based olefin, tetracyclododecene-based olefin, dicyclopentadiene-based olefin, and a derivative of any thereof. Examples of such derivative include substitutive derivatives of an alkyl group (preferably comprising 1 to 20 carbon atoms), an alkylidene group (preferably comprising 1 to 20 carbon atoms), an alalkyl group (preferably comprising 6 to 30 carbon atoms), a cycloalkyl group (preferably comprising 3 to 30 carbon atoms), a hydroxyl group, an alkoxy group (preferably comprising 1 to 10 carbon atoms), an acetyl group, a cyano group, an amide group, an imide group, a silyl group, an aromatic ring, and via ether bond and ester bond.

In addition, polystyrene can be preferably used as the second resin.

When selecting the second resin, Tg of the second resin is preferably higher than Tg of the polyethylene terephthalate-based resin by 25° C. or more, and particularly preferably by 30° C. or more. When a difference in Tg between the polyethylene terephthalate-based resin and the second resin is large, the second resin is first hardened when preparing a film of the blend. This lowers adhesion between the polyethylene terephthalate-based resin and the second resin at the interface and further lowers the tear strength. Tg can be determined with the use of a differential scanning calorimeter (DSC) at a temperature increase rate of 10° C./min.

In addition, the melt viscosity ratio of the second resin to the polyethylene terephthalate-based resin is preferably 0.3 to 1.6, and particularly preferably 0.8 to 1.5, at 270° C. and a shear rate of 121.6 (1/second). A difference in the melt viscosity between the polyethylene terephthalate-based resin and the second resin is preferably reduced and the melt viscosity ratio (the melt viscosity of the dispersion phase/the melt viscosity of the matrix; i.e., the melt viscosity of the second resin/the melt viscosity of the polyethylene terephthalate-based resin) is preferably approximated to 1. Thus, dispersibility is enhanced at the time of blending, and the resulting film is more easily torn. The melt viscosity can be determined in accordance with "the method of testing flow characteristics of thermoplastic resin using a capillary rheometer" (JIS K7199).

The polyethylene terephthalate-based resin is blended with the second resin to prepare a film via a conventional technique such as extrusion. Thus, the easy-to-tear, unstretched resin film according to the present invention can be obtained. Specifically, chips of the polyethylene terephthalate-based resin to be blended with chips of the second resin are mixed before they are introduced into an extruder, and the chip mixture may be introduced into an extruder and molten and mixed therein. Alternatively, the chips of the polyethylene terephthalate-based resin and the chips of the second resin are separately introduced into different extruders without mixing, and the polyethylene terephthalate-based resin and the second resin molten in separate extruders are mixed before extrusion and transferred to the die. Either of such methods may be employed. While a kneading temperature varies depending on a type of the second resin, it is preferably 255° C. to below 295° C., and more preferably 255° C. to below 285° C. It is preferable that the blended resin be retained in an extruder for 5 to 20 minutes.

A proportion of the polyethylene terephthalate-based resin to be blended with the second resin is not particularly limited. When the proportion of the polyethylene terephthalate-based resin is adjusted to 60% to 80% by weight, and preferably 65% to 75% by weight, and the proportion of the second resin is adjusted to 40% to 20% by weight, and preferably 35% to 25% by weight, the state of dispersion becomes ideal, and the tear strength of the resulting film can further be lowered.

When the resulting easy-to-tear, unstretched resin film is observed under a microscope, it is preferable that the second resin be dispersed in a particulate state in the polyethylene terephthalate-based resin. In addition, the average aspect ratio (long axis/short axis) of the second resin particles is 1 to 5, preferably 1 to 3, and particularly preferably 1 to 2 in the film plane. When the second resin is dispersed in a particulate form substantially equally in the longitudinal direction (MD direction) and in the transverse direction (TD direction) of the film (i.e., a low aspect ratio), the tear strength of the film can be further reduced, regardless of the direction of tear. The average aspect ratio is determined by observing the cross sections of the film in the MD direction and in the TD direction under a microscope, determining the average length of the randomly selected 10 second resin particles along the MD direction and the average length thereof along the TD direction of the film, and determining the ratio thereof.

The resin film according to the present invention obtained by the method described above is an easy-to-tear, unstretched resin film, and the tear strength is preferably 0.25 N or lower, and more preferably 0.2 N or lower in the longitudinal direction and in the transverse direction. It should be noted that the tear strength is not limited thereto, and higher tear strength is acceptable in accordance with the constitution and the application of the film. According to the present invention, the tear strength is measured using a tensile testing machine by the trouser tear test method in accordance with JIS K7128.

The thickness of the easy-to-tear, unstretched resin film according to the present invention can be adequately determined in accordance with applications of the film without particular limitation. For example, it can be 1 μm to 30 μm, preferably 2 μm to 25 μm, and more preferably 3 μm to 20 μm.

Figure 1:
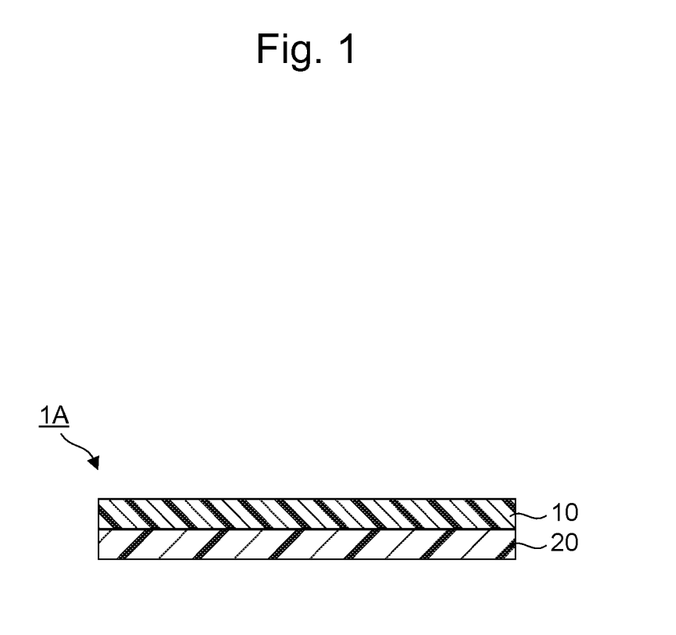
FIG. 1 shows a cross-sectional view of the laminate film for a packaging material according to an embodiment of the present invention.

Subsequently, a laminate film for a packaging material prepared with the use of the easy-to-tear, unstretched resin film as described above is described. FIG. 1 shows an embodiment of the laminate film for a packaging material according to the present invention. The laminate film 1A for a packaging material comprises an inner layer film 20 serving as a heat seal surface and the easy-to-tear, unstretched resin film 10 described above. On the surface opposite from the surface of the easy-to-tear, unstretched resin film 10 on which the inner layer film 20 is provided, according to need, one or more layers, such as the surface layer film described below and the substrate film, can further be provided, and the number of layers constituting the laminate film is not particularly limited. In addition, another layer, such as an adhesive layer, can be adequately provided between the easy-to-tear, unstretched resin film 10 and the inner layer film 20. The laminate film 1A for a packaging material can be used as a packaging material that is filled with a food product or a drug, such as a patch, and hermetically sealed with a heat seal of the inner layer film 20. Since the laminate film comprises the easy-to-tear, unstretched resin film 10 as a layer, the film can be easily torn and opened.

It is sufficient if the inner layer film 20 is heat sealable. In addition, it is preferable that the inner layer film 20 be drug resistant and non-absorbable to the oil component in accordance with a target to be hermetically sealed. A material of such inner layer film 20 can be adequately selected from among various types of resins, and specific examples thereof include polyacrylonitrile-based resin, polyethylene terephthalate-based resin, and cycloolefin-based resin. Among them, an isophthalic acid-modified polyethylene terephthalate resin having a copolymerization ratio of isophthalic acid component of 10 mol % to 20 mol % is excellent in heat sealability and thus is particularly preferable. The term "a copolymerization ratio of isophthalic acid component" used herein refers to a proportion of isophthalic acid relative to the whole dicarboxylic acid component.

An isophthalic acid-modified polyethylene terephthalate resin having a copolymerization ratio of isophthalic acid component of 10 mol % to 20 mol % used as the inner layer film 20 serving as a heat seal surface is excellent in terms of non-adsorbability to the oil component and heat sealability. Thus, the isophthalic acid-modified polyethylene terephthalate resin is suitably used as a material constituting the heat seal surface of the packaging material that can prevent the oil component in the patch from being transferred to the packaging material.

It is also possible to add various additives to the inner layer film 20, unless the heat sealability and the non-adsorbability are impaired. Examples of additives include an antioxidant, an ultraviolet absorber, an anti-hydrolysis agent, a fungicide, a curing catalyst, a plasticizer, a pigment, a filler, and a lubricant such as $SiO_2$. The amount of additives varies depending on types of additives and the amount is preferably in a range of 0% to 10% by weight in total in the inner layer film.

When the inner layer film 20 is excessively thick, tearability of the entire laminate film is likely to be deteriorated. When it is excessively thin, in contrast, heat seal strength is likely to be lowered. Thus, the thickness is adequately determined in view of the balance between tearability and heat seal strength. For example, it can be 1 μm to 20 μm, preferably 2 μm to 10 μm, and more preferably 3 μm to 8 μm, although the thickness is not limited thereto.

The laminate film 1A for a packaging material can be produced by any of known techniques of film formation. For example, a method of film formation comprising simultaneously subjecting a blend constituting the easy-to-tear, unstretched resin film 10 and resin constituting the inner layer film 20 to extrusion from a multilayer T die, a method of extrusion lamination comprising subjecting the easy-to-tear, unstretched resin film 10 to melt extrusion on the inner layer film 20 prepared in advance, or a method of dry lamination comprising separately preparing the easy-to-tear, unstretched resin film 10 and the inner layer film 20 and laminating the resulting films to each other with the aid of an adhesive can be adequately employed. The inner layer film 20 can be formed by a known film formation method such as T-die molding or inflation molding. In such a case, the film in a hot molten state is preferably solidified by rapid cooling. The rapid cooling inhibits the crystallization of the resin, so that a film that is excellent in heat sealability can be obtained. In addition, the inner layer film 20 is preferably in an unstretched state or in a state stretched with at a low draw ratio. When the inner layer film 20 is composed of the polyethylene terephthalate-based resin, oriented crystallization occurs due to stretching at a high draw ratio, and heat sealability may be deteriorated.

When the laminate film is actually used as a packaging material, one or more layers, such as a substrate film, can be further provided on the easy-to-tear, unstretched resin film 10. The substrate film is not particularly limited, and a film of biaxially stretched polyethylene terephthalate, biaxially stretched polyamide, or biaxially stretched polypropylene, or the like can be used, because they are excellent in transparency, printability, chemical resistance, and strength. The thickness of the substrate film (excluding a gas barrier layer described later) is preferably 5 μm to 20 μm, and particularly preferably 10 μm to 15 μm.

In order to prevent oxygen and steam from permeating the film, in addition, a gas barrier layer be preferably provided. For example, an aluminum foil can be used as the gas barrier layer. The aluminum foil is suitably used, because it is excellent in not only barrier properties against oxygen and steam, but also in light-shielding properties. When the gas barrier layer is provided, the thickness is preferably 2 μm to 20 μm, and particularly preferably 5 μm to 10 μm.

The packaging material composed of the laminate film 1A for a packaging material, the substrate film, the gas barrier layer, and the like can be made into a packaging bag, such as a general three-side or four-side sealed pouch, gusseted pouch, standing pouch, or pillow pouch. The bag-making can be carried out by a known method of bag-making.

The patch packaged with the above packaging material includes a support layer and an adhesive layer, in which a drug is included in the adhesive layer to treat or prevent various diseases through transdermal absorption of the drug. The drug is not particularly limited herein, and both systemically acting drugs and locally acting drugs can be used. Examples of the drug include adrenocorticosteroids, non-steroid anti-inflammatory agents, antirheumatics, hypnotics, antipsychotics, antidepressants, mood stabilizers, psychostimulants, anxiolytics, antiepileptics, migraine medications, Parkinson's disease drugs, muscarinic receptor antagonists, restless legs syndrome drugs, cerebral circulation metabolism-improving agents, anti-dementia drugs, autonomic drugs, muscle relaxants, antihypertensives, diuretics, hypoglycemics, hyperlipemic drugs, gout drugs, general anesthetics, local anesthetics, antibiotics, antifungals, antivirotics, antiparasitics, vitamins, antianginals, vasodilators, antiarrhythmics, antihistamines, mediator release inhibitors, leukotriene antagonists, sexual hormones, thyroid hormones, antithyroids, antitumor agents, antiemetics, anti-vertigenous drugs, bronchodilators, antitussives, expectorants, stop smoking aids, and antiosteoporotic agents. These drugs may be used in a free form or may be used in a salt form. These drugs may be used alone or in combinations of two or more.

The support layer is not particularly limited unless it is significantly uncomfortable when applied. Specifically, the support layer may be any of: for example, single films made of synthetic resins, such as polyesters, polyolefins including polyethylene and polypropylene, polyvinyl chloride, plasticized polyvinyl chloride, plasticized vinyl acetate-vinyl chloride copolymer, polyvinylidene chloride, ethylene-vinyl acetate copolymer, cellulose acetate, ethyl cellulose, ethylene-ethyl acrylate copolymer, polytetrafluoroethylene, polyurethane, and ionomer resins; laminate films thereof; porous films and sheets, nonwoven fabrics, and woven fabrics which are made of rubber, the above synthetic resins, polyesters such as polyethylene terephthalate, or polyamides such as nylon; and laminates of these and the above synthetic resin film.

The patch is a transdermal preparation that preferably has the adhesive layer containing a transdermal drug formed on one side of the support. It may also have a release-treated releasable film which is stacked on the opposite side to the adhesive layer.

The patch is in a planar flat form, and the planar shape is any of, for example, an approximately rectangle, a polygon, such as a triangle or pentagon, i.e., a shape outlined with an approximately straight line, a shape outlined with a curved line, such as an ellipse and circle, and combination of any thereof, although the shape is not limited thereto.

The size of the patch can be appropriately selected according to the application of the patch, a part to which the patch is applied, and other conditions. When the patch is approximately rectangular, for example, the length of its one side is 15 mm to 90 mm and the length of the other side is also 15 mm to 90 mm.

The patch usually has a total thickness of 50 μm to 2,000 μm and preferably has a total thickness of 100 μm to 1,000 μm. While the patch includes the support layer and the adhesive layer, the support layer usually has a thickness of 1 μm to 1000 μm, and the adhesive layer usually has a thickness of 10 μm to 200 μm, and preferably 15 μm to 150 μm.

The adhesive layer may contain an oil component. The contained oil component plasticizes the adhesive layer to impart a soft feeling, reduces skin irritation, and controls the transdermal absorption of the drug. The oil component is preferably in a liquid form at room temperature (25° C.). When two or more oil components are used in combination, alternatively, the oil mixture preferably becomes a liquid at room temperature (25° C.) in the end. Examples of the oil components include: higher alcohols such as oleyl alcohol and octyldodecanol; polyhydric alcohols such as glycerin, ethylene glycol, and polypropylene glycol; higher fatty acids such as caprylic acid and oleic acid; fatty acid esters such as isopropyl myristate, isopropyl palmitate, and ethyl oleate; polybasic acid esters such as diethyl sebacate and diisopropyl adipate; fatty acid esters of polyhydric alcohols such as triisostearate diglyceryl, sorbitan monooleate, propylene glycol dicaprylate, polyethylene glycol monolaurate, and polyoxyethylene sorbitol tetraoleate; polyoxyethylene alkyl ethers such as polyoxyethylene lauryl ether; hydrocarbons such as squalane and liquid paraffin; vegetable oils such as olive oil and castor oil; silicone oils; pyrrolidones such as N-methylpyrrolidone and N-dodecylpyrrolidone; and sulfoxides such as decyl methyl sulfoxide. These oil components may be used alone or in combinations of two or more.

The shape of the packaging bag for the patch of the present invention is not particularly limited as long as the packaging bag can package the patch. Examples thereof include an approximate rectangular shape such as a square or rectangle, a polygon such as a triangle or pentagon, a circle, and an ellipse. The shape of the packaging bag for a patch and the shape of the patch to be packaged therein may be the same or different as long as the patch can be individually packaged (hermetically sealed).

Figure 2:
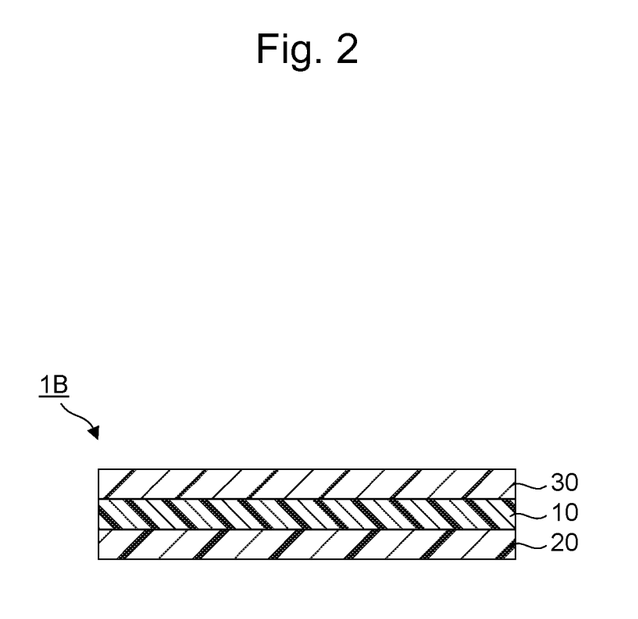
FIG. 2 shows a cross-sectional view of the laminate film for a packaging material according to another embodiment of the present invention.

Subsequently, FIG. 2 shows the laminate film for a packaging material according to another embodiment of the present invention. The laminate film 1B for a packaging material shown in FIG. 2 comprises the inner layer film 20 serving as a heat seal surface, the surface layer film 30, and the easy-to-tear, unstretched resin film 10 between the inner layer film 20 and the surface layer film 30.

The surface layer film 30 can be constituted by resin or the like, and it preferably has properties, such as heat resistance, drug resistance, and non-adsorbability. Examples of materials constituting the surface layer film 30 include polyacrylonitrile-based resin, polyethylene terephthalate-based resin, and cycloolefin-based resin. Among them, an isophthalic acid-modified polyethylene terephthalate resin having a copolymerization ratio of isophthalic acid component of 0 mol % to 5 mol % has sufficient non-absorbability to the oil component and thus is particularly preferable. Since the polyethylene terephthalate with a low modification rate described above is extensively used as a PET bottle material in large quantity, such material can be prepared in a cost-effective manner and thus is excellent in terms of economic efficiency.

When the surface layer film 30 is provided as shown in FIG. 2, the thickness thereof is not particularly limited. For example, the thickness is preferably 1 μm to 20 μm.

The laminate film 1B for a packaging material can be produced by any of known techniques of film formation. For example, a method of film formation comprising simultaneously subjecting the surface layer film 30, the easy-to-tear, unstretched resin film 10, and the inner layer film 20 to co-extrusion from a multilayer T die, a method of extrusion lamination comprising subjecting the easy-to-tear, unstretched resin film 10 to melt extrusion between the surface layer film 30 and the inner layer film 20 to adhere the films to each other, or a method of dry lamination comprising separately preparing the surface layer film 30, the easy-to-tear, unstretched resin film 10, and the inner layer film 20 and laminating the resulting films to each other with an adhesive agent can be adequately employed.

As with the case of the embodiment shown in FIG. 1, the laminate film 1B for a packaging material can further comprise a substrate film, a gas barrier layer, and the like stacked thereon, and packaging materials that are actually used can be prepared. Constitution of each layer is as described with reference to the embodiment shown in FIG. 1.

EXAMPLES

Hereafter, the present invention is described in greater detail with reference to examples and comparative examples, although the present invention is not limited to these examples.

(Production of Easy-to-Tear, Unstretched Resin Film and Tear Test Thereof)

Table 1 shows materials used for production of easy-to-tear, unstretched resin films. Abbreviations in Table 1 are defined as follows.
PET/IA2: Isophthalic acid-modified polyethylene terephthalate resin (a copolymerization ratio of isophthalic acid component: 2 mol %)
PMMA: Polymethyl methacrylate
COC: Cycloolefin copolymer (an ethylene/norbornene copolymer, values in parentheses indicate copolymerization ratios (wt %))
PEN: Polyethylene naphthalate
PP: Polypropylene
PS: Polystyrene
EVOH: Saponified ethylenevinyl acetate copolymer (values in parentheses indicate copolymerization ratios (mol %))
Tg: Glass transition temperature (° C.)
Melt viscosity: Value (Pa·s) at 270° C. and shear rate of 121.6 (1/second)

TABLE 1

| No | Resin type | Tg | SP value | Difference in SP value | Melt viscosity | Melt viscosity ratio |
|---|---|---|---|---|---|---|
| (i) | PET/IA2 | 75 | 12.4 | 0.0 | 4878 | — |
| (ii) | PMMA | 102 | 9.9 | 2.5 | 1432 | 0.294 |
| (iii) | PMMA | 109 | 9.9 | 2.5 | 2096 | 0.430 |
| (iv) | PMMA | 120 | 9.9 | 2.5 | 4727 | 0.969 |
| (v) | COC (35:65) | 78 | 10.0 | 2.4 | 2182 | 0.447 |
| (vi) | COC (23:77) | 134 | 10.3 | 2.1 | 1235 | 0.253 |
| (vii) | COC (20:80) | 138 | 10.4 | 2.0 | 4569 | 0.937 |
| (viii) | COC (18:82) | 158 | 10.4 | 2.0 | 7422 | 1.522 |
| (ix) | PEN | 155 | 12.7 | 0.3 | 3019 | 0.619 |
| (x) | PEN | 155 | 12.7 | 0.3 | 3699 | 0.758 |
| (xi) | PP | 0 | 8.0 | 4.4 | 6545 | 1.342 |
| (xii) | PS | 108 | 10.6 | 1.8 | 2119 | 0.434 |
| (xiii) | EVOH (32:68) | 57 | 13.6 | 1.2 | — | — |
| (xiv) | COP | 105 | 9.3 | 3.1 | 5328 | 1.092 |
| (xv) | COP | 140 | 9.3 | 3.1 | 5832 | 1.196 |

Melt viscosity ratio: Melt viscosity of dispersion phase/melt viscosity of matrix Materials shown in Table 1 were mixed at compositions shown in Table 2, and the mixtures were kneaded and extruded using an extruder to produce resin films of interest. The extrusion molding temperature was 270° C. The thickness of the resulting resin films was 20 μm. The produced resin films were subjected to the tear test under the conditions described below. Table 2 shows the results thereof. In Table 2, MD indicates the tear strength in the longitudinal direction (machine direction) and TD indicates the tear strength in the transverse direction.
Test method: Trouser test method
Test piece: Trouser test piece (longitudinal length: 150 mm: transverse length: 50 mm; slit length: 75 mm)
Test conditions: Test rate: 200 mm/minute; measurement temperature: 25° C. (room temperature)

TABLE 2

| | | | Tear strength (N) | |
|---|---|---|---|---|
| | Film composition | Difference in SP value | MD | TD |
| Ex. 1 | PET/IA2 (i):PMMA (ii) = 70:30 | 2.5 | 0.029 | 0.125 |
| Ex. 2 | PET/IA2 (i):PMMA (iv) = 70:30 | 2.5 | 0.008 | 0.017 |
| Ex. 3 | PET/IA2 (i):PMMA (iv) = 50:50 | 2.5 | 0.007 | 0.064 |
| Ex. 4 | PET/IA2 (i):COC (vi) = 70:30 | 2.1 | 0.036 | 0.034 |
| Ex. 5 | PET/IA2 (i):COC (viii) = 70:30 | 2.0 | 0.029 | 0.207 |
| Ex. 19 | PET/IA2 (i):PS (xii) = 70:30 | 1.8 | 0.027 | 0.066 |
| Ex. 20 | PET/IA2 (i):EVOH (xiii) = 70:30 | 1.2 | 0.080 | 0.430 |
| Ex. 21 | PET/IA2 (i):COP (xiv) = 70:30 | 3.1 | 0.007 | 0.208 |
| Ex. 22 | PET/IA2 (i):COP (xv) = 70:30 | 3.1 | 0.016 | 0.140 |
| Comp. Ex. 1 | PET/IA2 (i) Single layer | — | 0.516 | 0.497 |
| Comp. Ex. 2 | PET/IA2 (i):PEN (ix) = 30:70 | 0.3 | 0.334 | 0.412 |
| Comp. Ex. 3 | PET/IA2 (i):PEN (ix) = 50:50 | 0.3 | 0.350 | 0.408 |
| Comp. Ex. 4 | PET/IA2 (i):PEN (ix) = 70:30 | 0.3 | 0.309 | 0.289 |
| Comp. Ex. 5 | PET/IA2 (i):PEN (x) = 50:50 | 0.3 | 0.410 | 0.316 |
| Comp. Ex. 6 | PET/IA2 (i):PEN (x) = 70:30 | 0.3 | 0.393 | 0.310 |
| Comp. Ex. 8 | PET/IA2 (i):PP (xi) = 70:30 | 4.4 | 0.010 | 0.469 |

As shown in Table 2, the resin films of Examples 1 to 5 and Examples 19 to 22 prepared with the use of resins having a difference in SP value from PET/IA2 within a range of 1.1 to 4.0 (cal/cm$^3$)$^{0.5}$ as the second resins achieved lower tear strength and satisfactory properties as easy-to-tear resin films, compared with the films prepared with the use of PEN having a small difference in SP values and PP having a large difference in SP values. In contrast, the film of Example 3 in which the proportion of the second resin was 50 wt % was poor in film formation.

(Production of Laminate Film for Packaging Material and Tear Test Thereof)

Subsequently, the laminate film for a packaging material of a three-layer structure shown in FIG. 2 was produced and subjected to the tear test. Materials shown in Table 1 were used to produce the laminate film except for the inner layer film. The isophthalic acid-modified polyethylene terephthalate resin (a copolymerization ratio of isophthalic acid component: 15 mol %; PET/IA15) was used for the inner layer film.

The surface layer film was composed of PET/IA2 alone, and an inner layer film serving as a heat seal surface was produced with the addition of spherical silica particles (average particle diameter: 2.5 μm) to PET/IA15 as lubricants (the amount of addition: 10 wt % based on the whole inner layer film). The easy-to-tear, unstretched resin films (core layers) inserted between the surface layer films and the inner layer films were composed as shown in Table 3. Laminated films were prepared by simultaneously subjecting three layers to co-extrusion from a multilayer T die. The thickness of the resulting laminate films was 17 μm (the proportion of the surface layer, the core layer, and the inner layer: 3.6:9.8:3.6). As Comparative Example 7, a film of a two-layer structure consisting of the surface layer film and the inner layer film was formed to have a thickness of 17 μm, which was the same as the thickness of the laminate film with the core layer (the proportion of the surface layer to the inner layer: 13.4:3.6).

The laminate films for packaging materials of Examples 6 to 18 and Comparative Example 7 were subjected to the tear test under the conditions described below. Table 3 shows the results thereof.
Test method: Trouser test method
Test piece: Trouser test piece (longitudinal length: 150 mm; transverse length: 50 mm; slit length: 75 mm)
Test conditions: Test rate: 200 mm/minute; measurement temperature: 25° C. (room temperature)

TABLE 3

| | | | | Average tear strength (N) | |
|---|---|---|---|---|---|
| | Core layer composition | Tg of second resin | Ratio of melt viscosity | MD | TD |
| Ex. 6 | PET/IA2 (i):PMMA (ii) = 80:20 | 102 | 0.29 | 0.175 | 0.299 |
| Ex. 7 | PET/IA2 (i):PMMA (ii) = 70:30 | 102 | 0.29 | 0.162 | 0.266 |
| Ex. 8 | PET/IA2 (i):PMMA (iii) = 70:30 | 109 | 0.43 | 0.058 | 0.172 |
| Ex. 9 | PET/IA2 (i):PMMA (iii) = 65:35 | 109 | 0.43 | 0.070 | 0.122 |
| Ex. 10 | PET/IA2 (i):PMMA (iv) = 70:30 | 120 | 1.03 | 0.075 | 0.217 |
| Ex. 11 | PET/IA2 (i):PMMA (iv) = 65:35 | 120 | 1.03 | 0.040 | 0.132 |
| Ex. 12 | PET/IA2 (i):COC (v) = 70:30 | 78 | 0.45 | 0.198 | 0.266 |
| Ex. 13 | PET/IA2 (i):COC (vi) = 70:30 | 134 | 0.25 | 0.250 | 0.195 |
| Ex. 14 | PET/IA2 (i):COC (vii) = 70:30 | 138 | 0.94 | 0.077 | 0.169 |
| Ex. 15 | PET/IA2 (i):COC (vii) = 65:35 | 138 | 0.94 | 0.094 | 0.144 |
| Ex. 16 | PET/IA2 (i):COC (viii) = 70:30 | 158 | 1.52 | 0.075 | 0.155 |
| Ex. 17 | PET/IA2 (i):COC (viii) = 65:35 | 158 | 1.52 | 0.052 | 0.135 |
| Ex. 18 | PET/IA2 (i):COC (viii) = 60:40 | 158 | 1.52 | 0.112 | 0.084 |
| Comp. Ex. 7 | None (two layer of surface layer and inner layer) | — | — | 0.455 | 0.465 |

As shown in Table 3, the laminate films as a whole achieved low tear strength when the easy-to-tear, unstretched resin film according to the present invention was used as the core layer. While the films of Examples 6, 7, and 13 with the melt viscosity ratio outside the range of 0.3 to 1.6 and the film of Example 12 with low Tg of the second resin exhibited slightly higher tear strength than the films of other examples, the tear strength thereof was sufficiently lower than that of comparative examples. As a result of cross-sectional observation of the produced laminate films of Examples 14 and 16 under a microscope, dispersion of the second resin particles in PET/IA2 was observed. The average aspect ratio of the particles was determined by observing the cross sections of the films in the MD direction and in the TD direction under a microscope, determining the average length of the randomly selected 10 second resin particles along the MD direction and the average length thereof along the TD direction of the films, and determining the ratio thereof. Table 4 shows the results of measurement.

TABLE 4

|  | Average length of particles (nm) | | Average aspect ratio |
|---|---|---|---|
|  | MD | TD |  |
| Ex. 14 | 3.8 | 6.7 | 1.76 |
| Ex. 16 | 4.5 | 7.2 | 1.6 |

(Reference Examples: Evaluation of Tearability of Films with Increased Layers)

Laminated films of Reference Examples 2 to 7 were prepared by further stacking an adhesive layer, a 7-μm aluminum foil, an adhesive layer, and a 12-μm stretched PDT film in that order on each of the laminate films for packaging materials of Examples 8 to 11 and 17 and Comparative Example 7 (thickness: 17 μm). The film of Reference Example 1 was prepared by stacking a polyacrylonitrile film instead of the laminate film for a packaging material used in Reference Examples 2 to 7. The resulting laminate films were subjected to the tear test under the conditions described below. Table 5 shows the results thereof.

Test method: Trouser test method
Test piece: Trouser test piece (four-side seal pouch of 100 mm×100 mm; slit length: 10 mm)
Test conditions: Test rate: 200 mm/minute; measurement temperature: 23° C.-50% RH N number: 10

TABLE 5

|  | Laminate film composition | Average tear strength (N) | |
|---|---|---|---|
|  |  | MD | TD |
| Ref. Ex. 1 | — | 0.48 | 0.53 |
| Ref. Ex. 2 | Comp. Ex. 7 | 2.98 | 2.73 |
| Ref. Ex. 3 | Ex. 8 | 0.8 | 0.65 |
| Ref. Ex. 4 | Ex. 9 | 0.54 | 0.65 |
| Ref. Ex. 5 | Ex. 10 | 0.68 | 1.23 |
| Ref. Ex. 6 | Ex. 11 | 0.56 | 0.62 |
| Ref. Ex. 7 | Ex. 17 | 0.73 | 0.84 |

As shown in Table 5, the laminate films of Reference Examples 3 to 7 prepared with the use of the laminate film for a packaging material according to the present invention as a layer constituting the film achieved the ease of tear equivalent to that of Reference Example 1 prepared with the use of the PAN film. That is, such films were found to serve as alternatives to expensive PAN film.

DESCRIPTION OF REFERENCES 1A, 1B: Laminated films for a packaging material
10: Easy-to-tear, unstretched resin film
20: Inner layer film
30: Surface layer film All publications, patents, and patent applications cited herein are incorporated herein by reference in their entirety.

The invention claimed is:

1. An easy-to-tear, unstretched resin film consisting of a blend of a polyethylene terephthalate-based resin and a second resin having a difference in solubility parameter (SP) value from the polyethylene terephthalate-based resin of 1.1 to 4.0 $(cal/cm^3)^{0.5}$,
   wherein the second resin is a cycloolefin copolymer or polymethyl methacrylate;
   wherein the second resin is dispersed in a particulate state in the polyethylene terephthalate-based resin and the average aspect ratio of the particles is 1 to 1.76;
   wherein the film has a tear strength in the longitudinal direction of 0.25 N or lower and a tear strength in the transverse direction of 0.25 N or lower; and
   wherein the tear strength in the longitudinal direction and the tear strength in the transverse direction are measured according to the Trouser method using a test rate of 200 mm/minute at a temperature of 25° C.;
   wherein the polyethylene terephthalate-based resin is an isophthalic acid-modified polyethylene terephthalate resin having a copolymerization ratio of isophthalic acid component of 1 mol % to 5 mol %, based on the whole dicarboxylic acid component of the isophthalic acid-modified polyethylene terephthalate resin;
   wherein in the blend, the proportion of the polyethylene terephthalate-based resin is 65% to 75% by weight and the proportion of the second resin is 35% to 25% by weight.

2. The easy-to-tear, unstretched resin film according to claim 1, wherein the second resin has Tg that is higher than Tg of the polyethylene terephthalate-based resin by at least 25° C.

3. The easy-to-tear, unstretched resin film according to claim 1, wherein the melt viscosity ratio of the second resin to the polyethylene terephthalate-based resin is 0.3 to 1.6 at 270° C. and a shear rate of 121.6 (1/second).

* * * * *